(12) United States Patent
Farshchian et al.

(10) Patent No.: US 9,359,973 B2
(45) Date of Patent: Jun. 7, 2016

(54) MULTITUBE VALVELESS PULSE DETONATION ENGINE

(75) Inventors: Soheil Farshchian, Calgary (CA); Alejandro Juan, Calgary (CA)

(73) Assignee: Exponential Technologies, Inc., Calgary (CA)

( * ) Notice: Subject to any disclaimer, the term of this patent is extended or adjusted under 35 U.S.C. 154(b) by 1127 days.

(21) Appl. No.: 13/160,840

(22) Filed: Jun. 15, 2011

(65) Prior Publication Data

US 2011/0302908 A1 Dec. 15, 2011

Related U.S. Application Data

(60) Provisional application No. 61/354,829, filed on Jun. 15, 2010.

(51) Int. Cl.
| | | |
|---|---|---|
| *F02K 7/067* | (2006.01) | |
| *F02K 7/04* | (2006.01) | |
| *F02C 5/11* | (2006.01) | |
| *F23C 15/00* | (2006.01) | |

(52) U.S. Cl.
CPC ... *F02K 7/04* (2013.01); *F02C 5/11* (2013.01); *F02K 7/067* (2013.01); *F23C 15/00* (2013.01); *F23C 2900/03004* (2013.01)

(58) Field of Classification Search
CPC ............ F02K 7/02; F02K 7/04; F02K 7/067; F02C 5/00; F02C 5/11; F23R 7/007; F23R 7/00
USPC ......................................... 60/39.76, 247, 249
See application file for complete search history.

(56) References Cited

U.S. PATENT DOCUMENTS

| | | | | |
|---|---|---|---|---|
| 2,525,782 A | * | 10/1950 | Dunbar | 60/249 |
| 2,546,966 A | | 4/1951 | Bodine, Jr. | |
| 2,573,697 A | * | 11/1951 | Dunbar et al. | 60/224 |
| 2,659,198 A | * | 11/1953 | Cook | 60/247 |
| 2,937,500 A | * | 5/1960 | Bodine, Jr. | 60/39.77 |
| 3,213,523 A | | 10/1965 | Boehler | |
| 3,332,236 A | * | 7/1967 | Kunsagi | 60/39.39 |
| 4,639,208 A | * | 1/1987 | Inui et al. | 431/1 |
| 5,873,240 A | | 2/1999 | Bussing et al. | |

(Continued)

FOREIGN PATENT DOCUMENTS

| | | |
|---|---|---|
| CA | 2639774 | 1/2007 |
| EP | 04252362.1 | 4/2004 |
| JP | 2005064251 | 3/2005 |

*Primary Examiner* — Ehud Gartenberg
*Assistant Examiner* — Lorne Meade
(74) *Attorney, Agent, or Firm* — Dwayne E. Rogge; Schacht Law Office, Inc.

(57) ABSTRACT

Disclosed herein is a valveless multitube pulse detonation engine including: a plurality of detonation tubes, wherein each detonation tube comprises an independent discharge outlet, and the plurality of detonation tubes interconnected at a common air/fuel mixture intake port. In the disclosed engine, an air and fuel mixture is detonated in the detonation tubes simultaneously, and the common air/fuel mixture intake port minimizes back-pressure caused by detonating the air/fuel mixture by directing multiple reverse shock waves into one another and effectively using the back-pressures as reacting surfaces for one another and effectively reducing the effect of back flowing shock waves moving towards upstream. The detonation tubes may be non-linear, and may have independent discharges. The independent discharges may be coupled to an adapter nozzle terminating in a combined exhaust outlet.

22 Claims, 7 Drawing Sheets

(56) References Cited

U.S. PATENT DOCUMENTS

| | | |
|---|---|---|
| 6,003,301 A | 12/1999 | Bratkovich et al. |
| 6,375,454 B1 * | 4/2002 | Jacobsen et al. .................. 431/1 |
| 6,516,605 B1 | 2/2003 | Meholic |
| 6,584,765 B1 | 7/2003 | Tew et al. |
| 6,666,018 B2 | 12/2003 | Butler et al. |
| 6,868,665 B2 * | 3/2005 | Koshoffer et al. ............. 60/247 |
| 6,883,543 B2 | 4/2005 | Tew et al. |
| 6,931,833 B2 | 8/2005 | Lupkes |
| 6,938,588 B2 * | 9/2005 | Jacobsen et al. ............ 123/46 R |
| 6,983,586 B2 | 1/2006 | Tangirala et al. |
| 7,007,455 B2 * | 3/2006 | Kraft ................................ 60/247 |
| 7,669,406 B2 * | 3/2010 | Tangirala et al. .............. 60/247 |
| 7,758,334 B2 * | 7/2010 | Shimo et al. ....................... 431/1 |
| 7,886,866 B2 * | 2/2011 | Fullerton ...................... 181/117 |
| 2007/0245712 A1 | 10/2007 | Shimo et al. |

* cited by examiner

MULTITUBE VALVELESS PULSE DETONATION ENGINE

RELATED APPLICATIONS

This application claims priority benefit of U.S. Ser. No. 61/354,829, filed Jun. 15, 2010 and incorporated herein by reference.

BACKGROUND OF THE DISCLOSURE a) Field of the Disclosure

The invention is in the field of combustion energy generation and, more particularly, pulse detonation combustion.

b) Background Art

There has been extensive interest in pulse detonation technology in the past few decades for its potential for high efficiency power generation. Significant research has been carried out on pulse detonation operation and design and on improving pulse detonation combustors. One of the main challenges in pulse detonation combustors is controlling the pressure pulses generated during the detonation process and isolating their effect on the inlet line. There are several patents on various inlet valves for pulse detonation engines. There has been some research in designing passive aerodynamic features that perform similar to active valves. These features in the combustor reduce the backpressure on the inlet line during the detonation process without utilizing any moving components. These combustors are called valveless, pulse detonation engines (combustors).

SUMMARY OF THE DISCLOSURE

Disclosed herein is a valveless multitube pulse detonation engine comprising: a plurality of detonation tubes, wherein each detonation tube comprises an independent discharge outlet, and the plurality of detonation tubes interconnected at a common air/fuel mixture intake port. In the disclosed engine, an air and fuel mixture is detonated in the detonation tubes simultaneously, and the common air/fuel mixture intake port minimizes back-pressure caused by detonating the air/fuel mixture by directing multiple reverse shock waves into one another and effectively using the back-pressures as reacting surfaces for one another and effectively reducing the effect of back flowing shock waves moving towards upstream.

The valveless multitube pulse detonation engine as recited in described above may further comprise turbulence generators located within the detonation tubes, the turbulence generators operably configured to accelerate flame velocity. These turbulence generators may comprise a helical path along the length of a detonation chamber portion of each detonation tube.

The valveless multitube pulse detonation engine as described above may further include geometrical features positioned within the inlet ports to the combustion chambers, the geometrical features are selected from the list consisting of: convergent nozzles, divergent nozzles, porous plates, or fluid diodes. These geometrical features exert higher restriction in backward flow compared to forward flow.

The valveless multitube pulse detonation engine as recited in claim 1 wherein the common air intake port further comprises an air intake valve.

The valveless multitube pulse detonation engine as disclosed may be arranged wherein the discharge of each detonation tubes are merged to one exhaust outlet. This embodiment may include a unified convergent adapter nozzle.

The valveless multitube pulse detonation engine as disclosed in one form is arranged wherein the outlet of the detonation tubes is coupled to a turbine which is in turn configured to generate mechanical power from the combustion process within the valveless multitube pulse detonation engine. This turbine in one form is a positive displacement motion device. One form of such a positive displacement motion device is disclosed in U.S. Pat. No. 5,755,196 incorporated herein by reference.

In one embodiment, the detonation tubes are non-linear. One example of a non-linear configuration is shown wherein the non-linear detonation tubes comprise an arc of substantially 180°.

A valveless multitube pulse detonation engine is disclosed, comprising: a plurality of detonation tubes, wherein each detonation tube comprises an independent discharge. In one form, the plurality of detonation tubes are interconnected at a common air intake port wherein each detonation tube further comprises at least one fuel injector in fluid communication with the detonation tube to provide fuel thereto. This embodiment may be arranged wherein an air and fuel mixture is detonated in the detonation tubes simultaneously, and wherein the common air intake port is operably configured to minimizes the back-pressure by directing the reverse shock waves into one another and effectively using the shock pressures as reacting surfaces for one another and effectively reducing the effect of back flowing shock waves moving towards upstream.

The valveless multitube pulse detonation engine as recited above may further comprise turbulence generators located within the detonation tubes, the turbulence generators operably configured to accelerate flame velocity. These turbulence generators may comprise a helical path along the length of a detonation chamber portion of each detonation tube.

The valveless multitube pulse detonation engine as recited may be further comprise geometrical features in the inlet ports to the combustion chambers, the geometrical features may be convergent divergent nozzles, porous plates or fluid diodes, which exert higher restriction in backward flow compared to the forward direction. The valveless multitube pulse detonation engine as recited may include, an air valve at the common air inlet.

The valveless multitube pulse detonation engine as disclosed may be arranged wherein the discharge of each detonation tube is merged into one exhaust outlet. In one form, a unified convergent adapter nozzle is used to converge the independent discharges to a single exhaust outlet. The exhaust outlet of the detonation tubes may be connected to a turbine, such as a positive displacement motion device, to generate mechanical power from the combustion products.

The valveless multitube pulse detonation engine may be arranged wherein the detonation tubes are non-linear. The non-linear detonation tubes may comprise an arc of up to 180° or more.

DESCRIPTION OF THE PREFERRED EMBODIMENTS

The multitube, valveless combustor, disclosed here in one form, is composed of an inlet section, combustion initiation chambers, detonation chambers and discharge nozzle(s). The combustor operates with no moving parts (except a fuel injector) and no valve is utilized on the air path. The operation of the combustor is controlled by air throttle, fuel injection and an ignition system.

Figure 1:
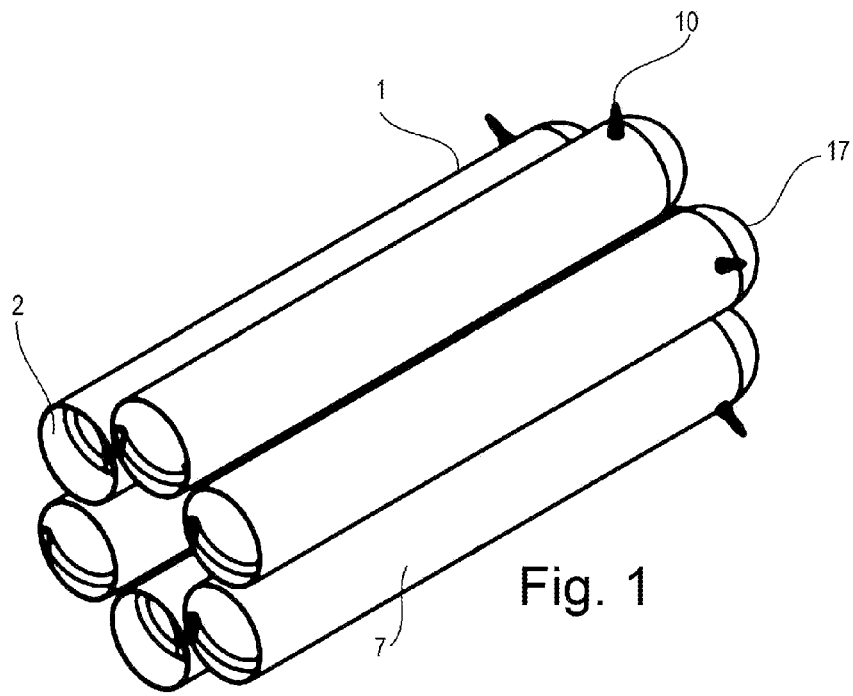
FIG. 1 shows an isometric view of the combustor in one form.

Combustor Structure:

Looking to FIG. 1, the combustor 1, in one form, operates on a pulse detonation principle where fuel is burned instantly (detonated) at constant volume and the resulting high-pressure, high temperature products exit the discharge 2 of the combustor.

Figure 2:
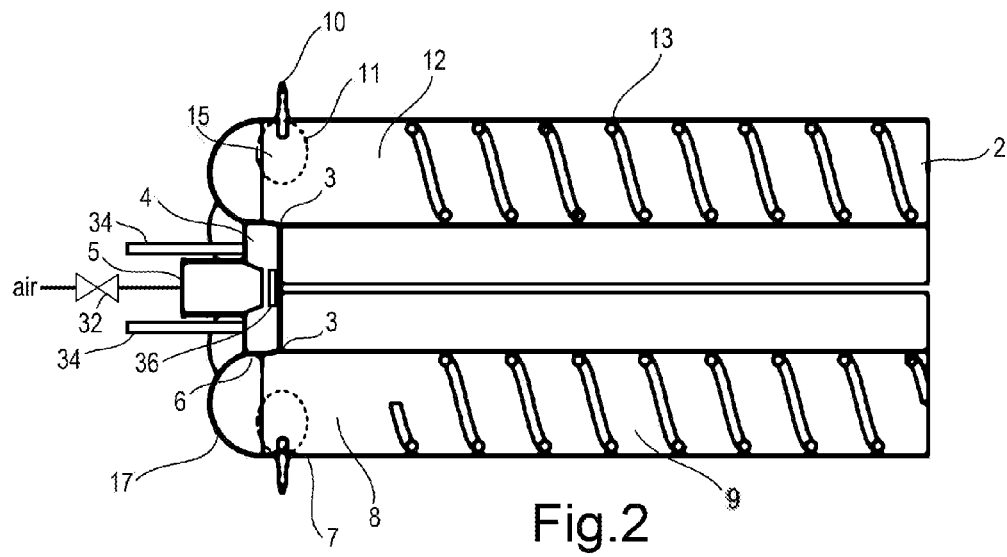
FIG. 2 shows a cross section of the combustor in one form and a first stage of the detonation process and shock/wave-flame front propagation in the combustor.

Looking to the cutaway view of FIG. 2, air enters the combustor through the air inlet 5. Inlet air may be preheated prior to entering the combustor by the exhaust or by heat conducted through the combustor walls. Fuel is injected into an air stream and mixed with air at the inlet manifold 4. The inlet manifold has one air inlet 5 with multiple manifold outlets 6. Each manifold outlet is connected to one detonation tube 7. Each detonation tube 7 comprises a combustion chamber 8 and a detonation chamber 9.

While the combustor itself may be valveless, an air intake valve 32 may be utilized outside of the combustor itself.

Turbulence generators 13 such as Shchelkin spirals may be utilized to improve mixing of the air and fuel in the inlet manifold. The combustion chamber and intake manifold may be equipped with dispersion features that distribute the air-fuel evenly between the detonation tubes 7 while minimizing the back-flow into the chamber inlets 3 during the combustion and detonation process. The dispersion features 36 may be convergent-divergent nozzles, porous plates, surface irregularities or other geometrical or aerodynamic features, in one form. In one form, no moving parts are utilized in the air stream for combustion control.

Figure 3:
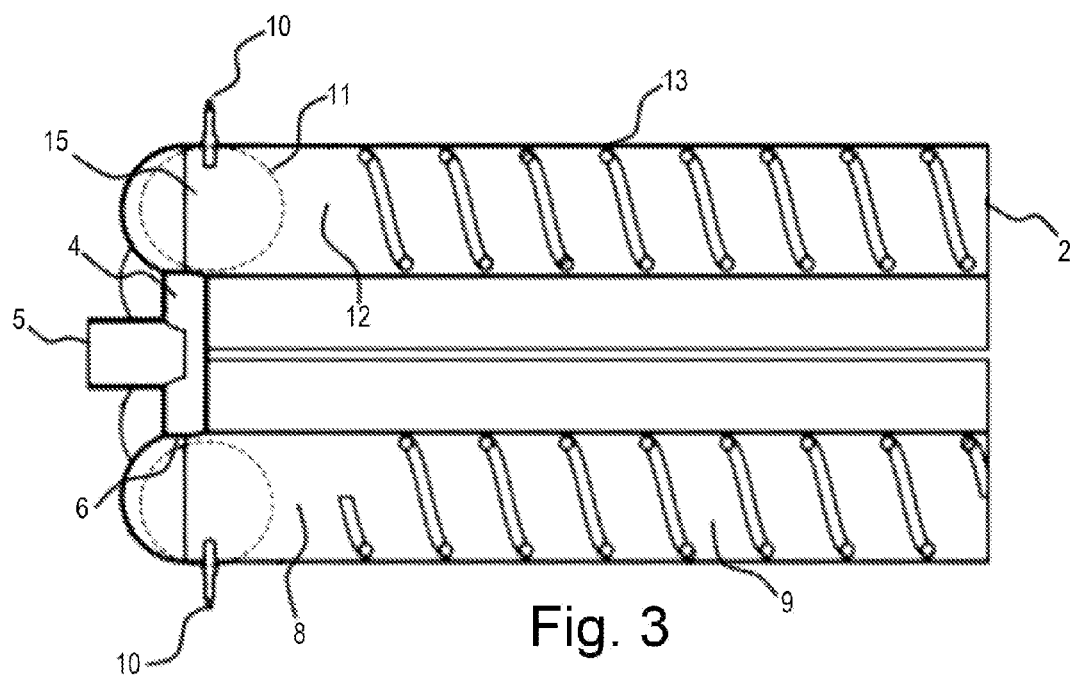
FIG. 3 shows a cross section of the combustor in one form and a second stage of the detonation process and shock/wave-flame front propagation in the combustor.
Figure 4:
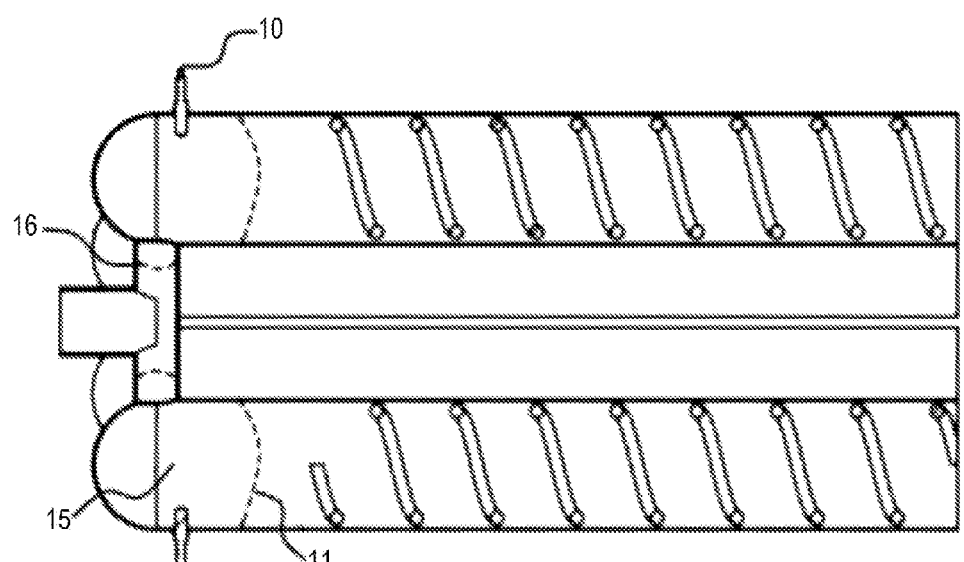
FIG. 4 shows a cross section of the combustor in one form and a third stage of the detonation process and shock/wave-flame front propagation in the combustor and intake manifold.
Figure 5:
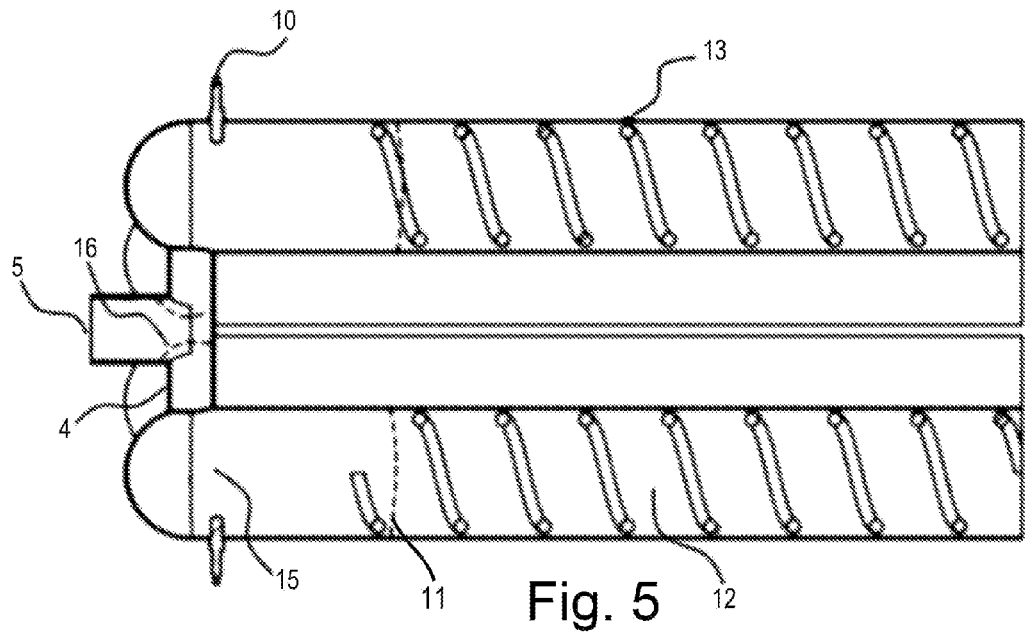
FIG. 5 shows a cross section of the combustor in one form and a fourth stage of the detonation process and shock/wave-flame front propagation in the combustor and intake manifold.
Figure 6:
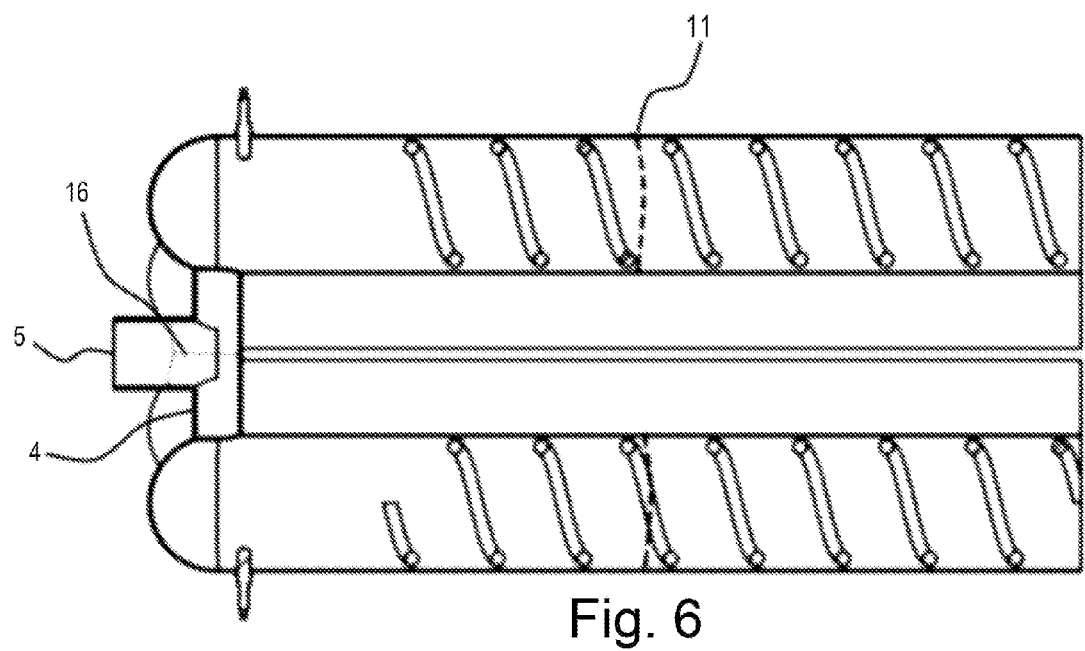
FIG. 6 shows a cross section of the combustor in one form and a fifth stage of the detonation process and shock/wave-flame front propagation in the combustor and air inlet.

In one mode of operation, shown in FIGS. 2-7, once the combustion chamber 8 and detonation chamber 9 are substantially filled with the required volume of air-fuel mixture, the fuel injection process is stopped. After a certain time lag, the igniters 10 are activated and combustion is initiated. The flame front 11 in the combustion chamber is initially a substantially spherical shape as depicted in FIGS. 2 and 3. As the combustion continues, the flame front expands through the non-combusted mixture 12. As the combustion heat is released, the flame front is accelerated to high velocities due to released heat within a confined space. The flame acceleration may be increased by utilizing turbulence generators such as Shchelkin spirals or equivalents. The flame velocity increases until it reaches Chapman-Jouguet (C-J) condition, where the flame front travels at a supersonic, constant speed. The flame front in this condition is coupled (attached) to a compressive shock wave that increases the pressure and temperature of the combusted products through a constant volume detonation process. The C-J condition determines the peak detonation pressure and flame velocity and is a function of fuel type, detonation mixture, pressure and temperature. Therefore, the detonation results in increased pressure and temperature in combusted products 15. The pressure in the combusted gas products is higher than the air pressure in the inlet section. Therefore, shock waves 16 propagate towards the combustor inlet as shown in Figs. 4-6. Having several combustion chambers at each detonation, multiple shock waves propagate simultaneously. Consequently, these shock waves converge at the inlet manifold 4 as shown in FIG. 6. The convergence of the shock waves and the dispersion features in the inlet manifold 4 reduce the backpressure; therefore, pressure rises in the detonation tube with significantly reduced backpressure effects on the inlet stream. This causes the pressure to rise in the detonation tube, which results in high thrust forces on the thrust plate 17 for thrust generation applications or high pressure at the outlet of the combustor for work extraction and turbine power generation. The air inlet 5 may be designed with features that minimize the backpressure on the air inlet line.

Figure 8:
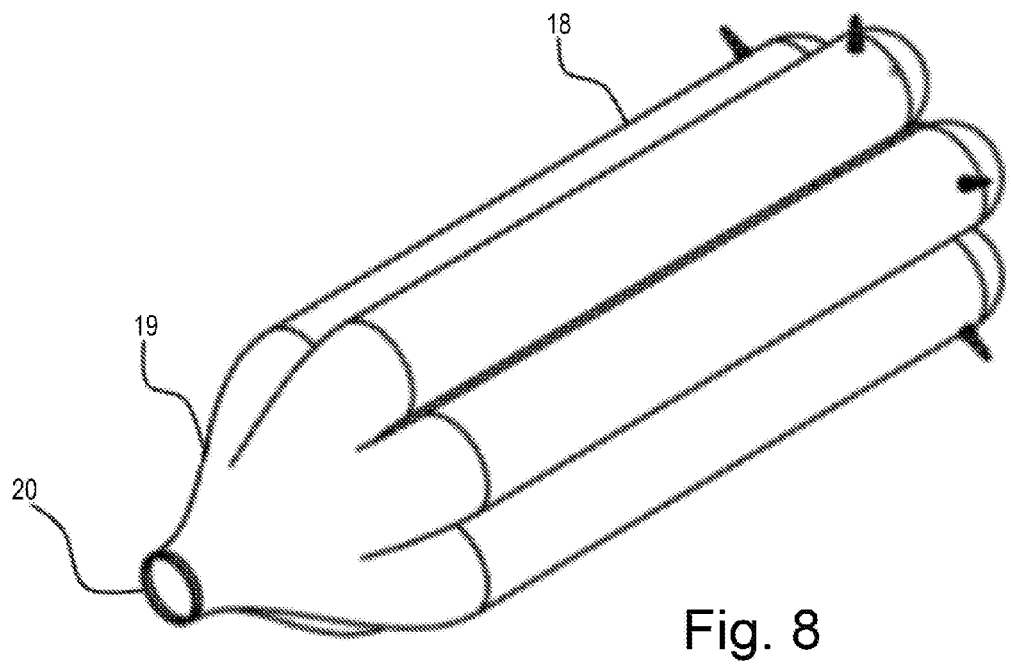
FIG. 8 shows an embodiment of the combustor with adapter nozzle and single exhaust outlet.
Figure 9:
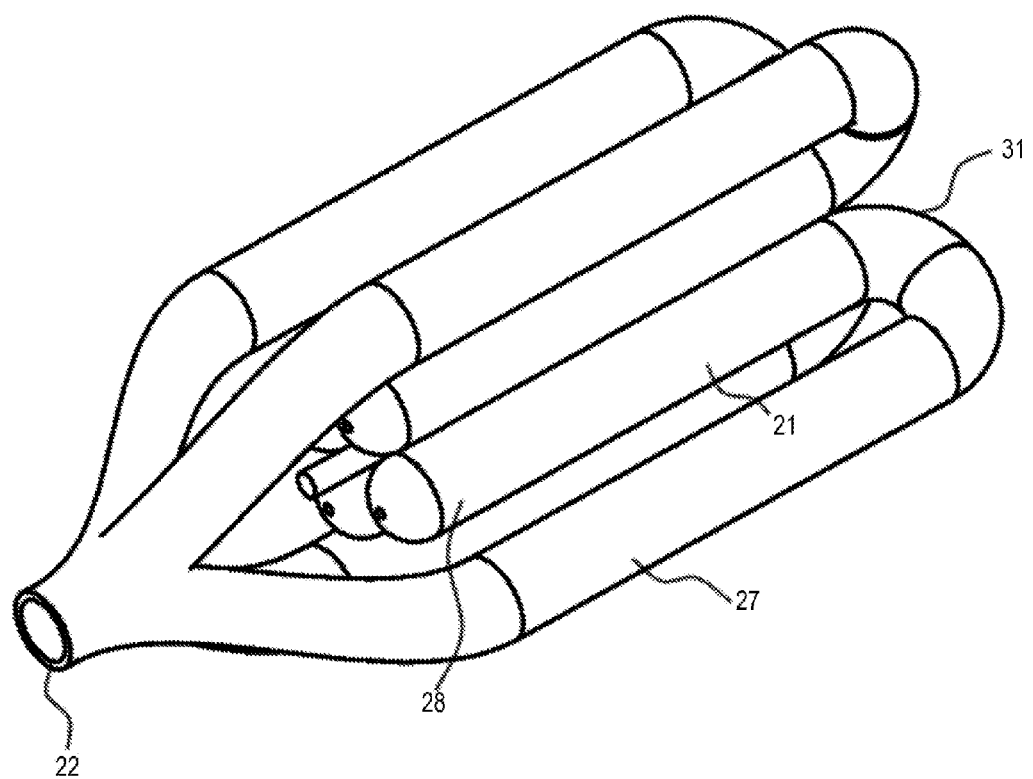
FIG. 9 shows an isometric view of a non-linear tube embodiment of the combustor.
Figure 10:
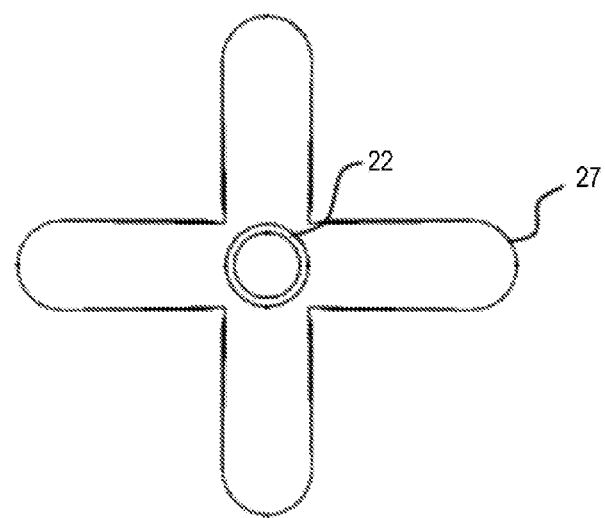
FIG. 10 shows a front or end view of the embodiment shown in FIG. 9.
Figure 11:
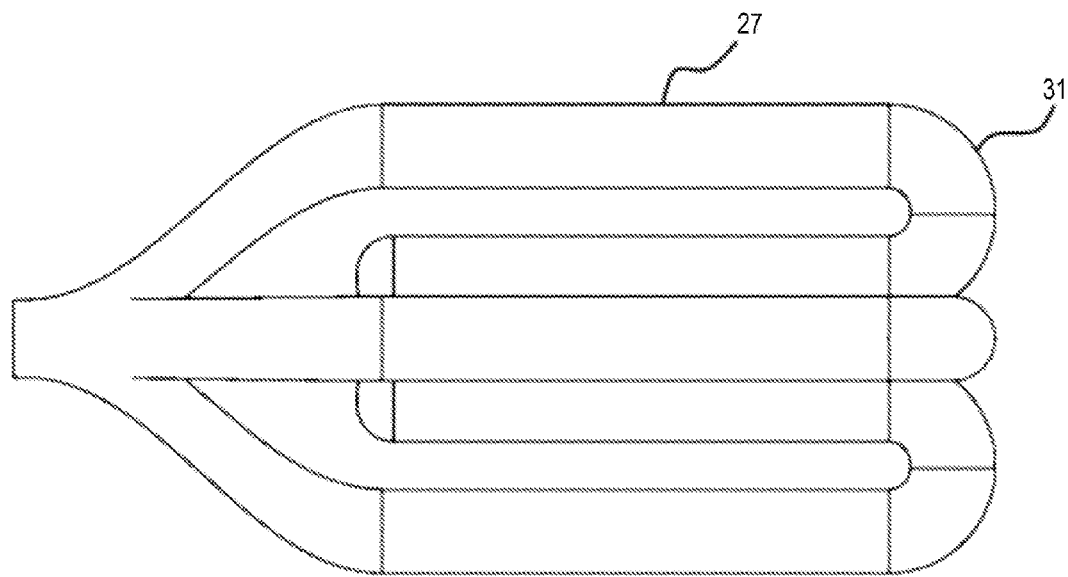
FIG. 11 shows a side perspective view of the embodiment shown in FIG. 9.

The detonation tubes may have independent discharges, or, in the embodiment of FIG. 8, the exhaust of two or more detonation tubes 18 may be merged to a unified nozzle adapter 19 to form a single exhaust outlet 20. The shock waves are guided towards the discharge nozzle, which could be open to ambient (for thrust generation) or mounted to an expander for mechanical power generation. Once detonation is completed, pressure starts to drop in the combustion chamber and air is entered to the combustor for the purge process. After the purge process is completed, fuel injection is re-initiated for the next detonation cycle.

A pulse detonation combustor is shown in one form with two or multiple detonation branches (tubes). All the detonation tubes may be operated substantially simultaneously.

The detonation tubes 7 are each fed by a unique combustion chamber 8, where the shock waves of individual tubes 7 are configured to interact to minimize back flow within the intake manifold 4 during high-pressure detonation stage.

In one form, the chamber (air) inlet 3 to each combustion chamber 8 is designed such that minimum backpressures are transferred to the air inlet 5.

The discharge 2 of the detonation tubes 7 can be joined to one exhaust 20 as shown in FIG. 8, or multiple exhausts as shown in FIGS. 1-6. The detonation outlet may be to ambient (thrust generation applications) or one or multiple turbines for shaft power generation.

There are three relevant patents that disclose valveless operating, pulse detonation combustors. Two of these combustor designs are controlled by ignition system only as there is no control over fuel injection. Therefore, there is continuous flow of air and fuel into these combustors and it is not possible to perform an efficient purge of combustion products before the next cycle fuel injection. One concept disclosed by United Technologies (U.S. Pat. No. 6,584,765) incorporated herein by reference, uses angled inlets for air and fuel to push the mixture towards the spark plug located at the closed end of the combustor. In addition, a rotating disk is utilized for air and fuel injection. Even though this concept is called a "valveless" pulse detonation engine (PDE), a valve is utilized in the inlet. This concept is functional with close to vacuum outlet pressure and is proposed for thrust generation in spacecrafts. Another concept is disclosed by Shimo et al (US Application 2007/0245712), also incorporated herein by reference, where a combination of a porous plate, a large combustion chamber and a long inlet section is proposed to reduce the backpressure in the inlet line.

U.S. Pat. No. 6,666,018 B2, also incorporated herein by reference, by General Electric Company, introduces a hybrid pulse detonation engine coupled with a regular jet engine. The patent states, "In one embodiment the system is controlled with a continuous detonation valveless system that incorporates a pre-burning device." This is in reference to the two-stage pulse detonation combustor introduced in U.S. Pat. No. 6,983,586. In this concept, pulse detonation combustors are utilized in a regular jet engine as the main burner or an augmenter. The patent specifies multitube, standalone, pulse detonation combustors that operate independently. Each combustor operates independently from the other combustor and the effect of one combustor detonation does not impact other detonation tubes. This concept is substantially different from the concept presented in this disclosure, wherein the detonation tubes are interacting with each other. Other novel features in this disclosure include a novel air-fuel mixing arrangement, air-preheating arrangement, and air inlet manifold.

The concept disclosed herein differs from previous designs in several following features. The disclosed combustor 1 is a multitube pulse detonation combustor. The detonation tubes 7 are operated in-phase and detonation is performed simultaneously in all detonation chambers 9. In prior art, multitube combustors, detonation is normally performed with different timing in each detonation tube in order to reduce the shock and power variation during the operation.

In one form, the air inlet 5 is shared between the multiple detonation chambers 9. The reverse pressure waves exiting the detonation tubes 7 towards the chamber inlets 3 are weakened by dispersion features, and are also directed such that they converge to the same region within the inlet manifold 4 and counteract each other. The counteraction of the detonation pulses reduces the backpressure effects on the inlet 5. Several prior multitube combustor patents specify unconnected inlets for each detonation tube such that each combustion tube can operate independently of other tubes.

The disclosed combustor 1, in at least one embodiment, may utilize a porous plate or other dispersion features to reduce the effect of detonation backpressure on air inlet 5. Utilizing convergent/divergent nozzles and the convergence and interaction of pressure pulses provides such effect. Several prior patents utilize a mechanical valve; however, there are some valveless pulse detonation combustor patents, for example US Patent Application 2007/0245712 A1, incorporated herein by reference specifies valveless operation. This prior design requires a porous plate to reduce the effect of shock wave in upstream and in the intake line.

The combustor tube may be curved, bent, spiral, or otherwise non-linear such as shown in FIGS. 9-12. In one embodiment the combustor tube can be made from several U-shaped tubes joined together. In another embodiment, the combustor tube could have a spiral profile. The bend radius of the combustor shall be greater than the diameter of the combustion chamber to maintain the detonation wave propagation speed while in operation. The curvature of the combustion chamber may not eliminate the need for turbulence generators (ex. Shchekin spirals) and flame accelerators may be included to decrease the deflagration-to-detonation (DDT) distance. It may be desired that the profile of the flame accelerators should follow that of the combustor.

Outlet nozzles may be utilized at the combustor exhaust port, upstream the expander inlet, to increase the flow pressure as it enters the expander. The nozzle may have different cross section variations (convergent or divergent) depending on the expander application and the working load. For example, when high pressure is required, a divergent nozzle will be utilized to decrease the flow velocity and increase the gas pressure at the expander inlet.

The combustor may be constructed with one or multiple combustion and detonation chambers, each combined combustion/detonation chamber pair operating as standalone combustion systems with the individual exhausts merged and directed towards a turbine. In this configuration, the combustion process in the detonation chambers may be performed sequentially, rather than simultaneously, which provides smoother power to the turbine.

FIGS. 1-12 show different views of a multitube, pulse detonation combustor. Air and fuel may be mixed upstream and flow into the combustion chambers through inlet nozzles. After the required amount of combustion mixture is injected, fuel injectors are closed, and ignition is started in the combustion chambers simultaneously by multiple ignition sources. The ignition source may be spark ignition, laser, plasma or other ignition source. The flame front is accelerated as it passes through the flame accelerators in the detonation tubes. The flame accelerator may be any turbulence-generating feature in the detonation tube. The discharge of the two combustors may be independent (as shown in FIGS. 1-3) or joint (as shown in FIGS. 4-6). The shock waves and the combustion products exit the discharge at high pressure and high temperature. The combustor is then purged and the next detonation cycle is started.

In the FIGS. 1-8 a combustor embodiment with six circular detonation chambers and a fuel injector 34 is illustrated in FIG. 2. The disclosed engine is not intended to be limited to an embodiment with six detonation chambers, and includes embodiments with two or more detonation chambers.

FIGS. 2-7 show a cross section of the combustor in one form and the detonation process and shock/wave-flame front propagation within the combustor.

FIG. 8 shows an embodiment of the combustor with a unified nozzle and single discharge. The exhaust of the combustors may be combined together creating one unified discharge for each combustion tube of the combustor. Since in one form all the detonation chambers are operated substantially simultaneously, for an exhaust nozzle with no nozzling effect, the cross section area of the single discharge may be equal to the sum of the cross section of all the detonation chambers. However, the discharge may be comprised of a nozzle set (convergent or divergent) that will adjust the exhaust condition (pressure, temperature and speed) based on the operation point of the combustion chamber. For example in FIG. 9 the discharge nozzle 22 cross section may be smaller than the total cross section area of the four combustion chambers 28, generating a unified convergent discharge nozzle 22.

Figure 12:
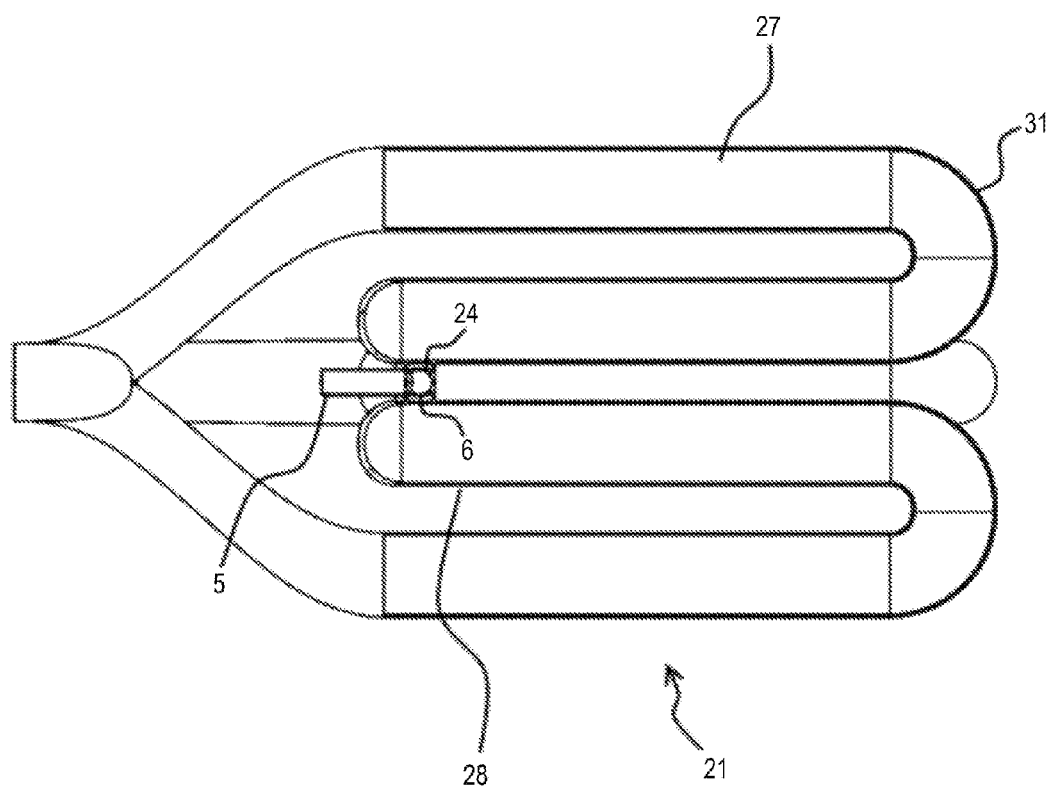
FIG. 12 shows a side perspective cutaway plan view the embodiment shown in FIG. 9.

In one form of the multitube valveless combustor 21, the detonation chambers are connected to each other through the inlet manifold 24 as shown in FIG. 12 and pressure variation in one combustion chamber 28 will affect the other detonation chambers.

The detonation tube 27 of a pulse detonation device or combustor 21 may be bent or curved as shown in FIGS. 9-12. Where possible, elements of the curved design shown in FIGS. 9-12 use the same number as the previous embodiments, with a numeral 2 prefix. For example, in the curved embodiment the detonation tubes are identified with the number 27, whereas in the prior embodiment, the numeral 7 was used to denote each detonation tubes. The detonation tubes 27 of the multitube combustor may be curved, bent or angled. Experiments have confirmed that the detonation wave can follow the non-linear axis of the detonation chamber for low curvature bends 31. Therefore, a combustion chamber 28 may be curved, bent, or otherwise non-linear to obtain a more compact design. This bent design applies to single or multitube combustors.

Figure 7:
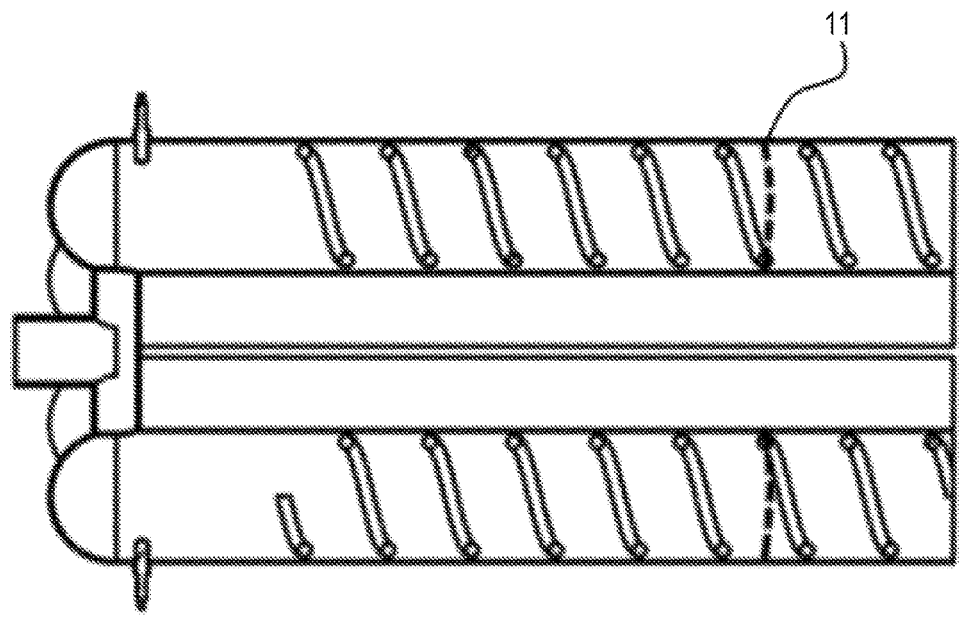
FIG. 7 shows a cross section of the combustor in one form and a sixth stage of the detonation process and shock/wave-flame front propagation in the combustor.

While the embodiment shown in FIGS. 9-12 shows a single unified discharge with the detonation tubes 27 similar in function to the detonation tubes 7 of FIG. 7 of the previous embodiment, the same curved arrangement of the detonation tubes 27 could be incorporated into a multiple discharge arrangement as shown in FIG. 1 for alternate uses.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

We claim:

1. A valveless multitube pulse detonation engine comprising:
    a plurality of detonation tubes radially centered around a single air inlet having a center longitudinal axis, the single air inlet connected at a downstream end to an inlet manifold where fuel is mixed with air from the single air inlet forming an air and fuel mixture;
    each detonation tube comprises a combustion chamber inlet end and an independent discharge outlet end opposite the combustion chamber inlet end;
    the inlet manifold having a plurality of manifold outlets downstream of the single air inlet, each of the plurality of detonation tubes connected at the combustion chamber inlet end to one manifold outlet of the plurality of manifold outlets;
    wherein each of the plurality of manifold outlets are radially equidistant from the center longitudinal axis of the single air inlet;
    wherein the air and fuel mixture is simultaneously detonated in each of the plurality of detonation tubes;
    wherein the simultaneous detonation creates a plurality of shock waves that simultaneously propagate from each combustion chamber inlet end into each of the plurality of manifold outlets, each of the plurality of shock waves converging at the center longitudinal axis, the converging shock waves acting as reacting surfaces for one another and effectively reducing the effect of back flowing shock waves upstream of the inlet manifold.

2. The valveless multitube pulse detonation engine as recited in claim 1, further comprising turbulence generators located within the detonation tubes, the turbulence generators operably configured to accelerate flame velocity.

3. The valveless multitube pulse detonation engine as recited in claim 2, wherein the turbulence generators comprise a helical path along the length of a detonation chamber portion of each detonation tube.

4. The valveless multitube pulse detonation engine as recited in claim 1, further comprising
    dispersion features positioned within the inlet manifold to evenly distribute the air and fuel mixture to the detonation tubes, the dispersion features are selected from the list consisting of: convergent nozzles, divergent nozzles, porous plates, and fluid diodes;
    wherein the dispersion features exert higher restriction in backward flow compared to forward flow.

5. The valveless multitube pulse detonation engine as recited in claim 1 wherein the single air inlet further comprises an air valve.

6. The valveless multitube pulse detonation engine as recited in claim 1 further comprising a unified convergent adapter nozzle merging the discharge outlet end of each detonation tubes into one exhaust outlet.

7. The valveless multitube pulse detonation engine as recited in claim 6 wherein the exhaust outlet of the detonation tubes is coupled to a turbine which is in turn configured to generate mechanical power from the combustion process within the valveless multitube pulse detonation engine.

8. The valveless multitube pulse detonation engine as recited in claim 7 wherein the turbine is a positive displacement motion device.

9. The valveless multitube pulse detonation engine as recited in claim 1, wherein the detonation tubes are non-linear.

10. The valveless multitube pulse detonation engine as recited in claim 9, wherein the non-linear detonation tubes comprise an arc of substantially 180°.

11. The valveless multitube pulse detonation engine as recited in claim 9, further comprising a unified convergent adapter nozzle that merges the discharge outlet end of each detonation tubes into one exhaust nozzle.

12. A valveless multitube pulse detonation engine comprising:
    a plurality of detonation tubes radially centered around a single air inlet having a center longitudinal axis, the single air inlet connected at a downstream end to an inlet manifold where fuel is mixed with air from the single air inlet forming an air and fuel mixture;
    each detonation tube comprising a combustion chamber inlet end and an independent discharge outlet end opposite the combustion chamber inlet end;
    the inlet manifold having a plurality of manifold outlets downstream of the single air inlet, each of the plurality of detonation tubes connected at the combustion chamber inlet end to one manifold outlet of the plurality of manifold outlets;
    wherein each of the plurality of manifold outlets are radially equidistant from the center longitudinal axis of the single air inlet;
    wherein each detonation tube further comprises at least one fuel injector in fluid communication with the detonation tube to provide fuel thereto;
    wherein the air and fuel mixture is detonated in each of the plurality of detonation tubes simultaneously, the simultaneous detonation producing multiple reverse shock waves; and
    wherein each of the plurality of manifold outlets are radially aligned around the center longitudinal axis of the single air inlet so as to minimize back-pressure by directing the multiple reverse shock waves into one another inside the inlet manifold and effectively using the shock wave pressures as reacting surfaces for one another and effectively reducing the effect of back flowing shock waves upstream of the inlet manifold into the single air inlet.

13. The valveless multitube pulse detonation engine as recited in claim 12, further comprising turbulence generators located within the detonation tubes, the turbulence generators operably configured to accelerate flame velocity.

14. The valveless multitube pulse detonation engine as recited in claim 13, wherein the turbulence generators comprise a helical path along the length of a detonation chamber portion of each detonation tube.

15. The valveless multitube pulse detonation engine as recited in claim 12, wherein geometrical features are used in the inlet manifold to evenly distribute the air and fuel mixture to the detonation tubes, the geometrical features selected from the list of consisting of convergent divergent nozzles, porous plates and fluid diodes, which exert higher restriction in backward flow compared to the forward direction.

16. The valveless multitube pulse detonation engine as recited in claim 12, wherein the single air inlet is equipped with an air valve.

17. The valveless multitube pulse detonation engine as recited in claim 12, further comprising a unified convergent adapter nozzle merging the discharge outlet end of each detonation tube into one exhaust outlet.

18. The valveless multitube pulse detonation engine as recited in claim 17, wherein the exhaust outlet of the detonation tubes is connected to a turbine to generate mechanical power from the combustion products.

19. The valveless multitube pulse detonation engine as recited in claim 18, wherein the turbine is a positive displacement motion device.

20. The valveless multitube pulse detonation engine as recited in claim 12, wherein the detonation tubes are non-linear.

21. The valveless multitube pulse detonation engine as recited in claim 20, wherein the non-linear detonation tubes comprise an arc of substantially 180°.

22. The valveless multitube pulse detonation engine as recited in claim 20, further comprising a unified convergent adapter nozzle converging the discharge outlet end of each detonation tubes into a single exhaust outlet.

* * * * *